United States Patent Office 3,012,069
Patented Dec. 5, 1961

3,012,069
POLYFLUORINATED PRODUCTS
John J. Drysdale, Wilmington, Del., assignor to E. I. du Pont de Nemours and Company, Wilmington, Del., a corporation of Delaware
No Drawing. Filed June 19, 1959, Ser. No. 825,631
13 Claims. (Cl. 260—487)

This invention relates to a new process for the preparation of polyfluorinated acyloin esters and polyfluorinated enediol esters, and to certain new such esters. It also includes methods of converting these esters to polyfluorinated acyloins, 1,2-glycols, and 1,2-diketones, and to certain such new polyfluorinated products.

In my copending application Serial No. 742,037, filed June 16, 1958, now Patent No. 2,957,031, the reaction at temperatures from 100–200° C. between polyfluoroacyl halides and nickel carbonyl with aromatic compounds containing at least one hydrogen on nuclear carbon is shown to result in the formation of fluoroalkyl aromatic compounds wherein the polyfluorocarbyl radical of the polyfluoroacyl halide is attached to the said hydrogen-bearing nuclear carbon atom. In my copending application Serial No. 742,062, filed June 16, 1958, now Patent No. 2,925,446, the reaction between polyfluoroacyl halides and nickel carbonyl at temperatures from 40–200° C. in the absence of any other reactant or any reaction medium is shown to result in the formation of polyfluoroolefins and polyfluoroketones.

It has now surprisingly been discovered that the same polyfluoroacyl halides react with nickel carbonyl in the presence of benzonitrile and at temperatures below 40° C. to form polyfluoroacyloin esters and enediol diesters. The reaction can be schematically represented as follows:

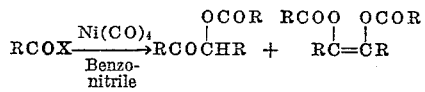

wherein R is a monovalent perfluorocarbyl or ω-hydro- or ω-chloroperfluorocarbyl radical free of aliphatic unsaturation and of from three through fourteen carbons. Because of somewhat readier availability of the necessary intermediates and somewhat more convenient preparation of the products, the preferred such radicals are those of from three through ten carbons, particularly the ω-hydro such radicals.

The operating conditions for this surprising reaction are quite critical and extremely specific. Thus, the reaction must be carried out using benzonitrile as a reaction medium. Furthermore, only nickel carbonyl and no other metal carbonyl can be used. Finally, the reaction must be effected at temperatures no higher than 40° C. and, practically speaking, in the extremely narrow temperature range from substantially room temperature to 40° C. With the shorter chain, lower boiling, more reactive perfluoro-, ω-hydroperfluoro-, and ω-chloroperfluorocarbacyl halides, the reaction can be effected at somewhat lower temperatures or else in the above indicated temperature range operating under slight pressure to maintain the low boiling acyl halides in the liquid phase. However, under such conditions the operating pressure must be controlled quite narrowly so as to permit the escape from the reaction zone of the necessarily formed carbon monoxide gas. Otherwise with build-up in carbon monoxide pressure, the necessary decomposition of nickel carbonyl would be halted.

These polyfluoroacyloin esters and enediol diesters are versatile chemical intermediates. Thus, by simple alcoholysis, both the acyloin esters and the enediol diesters can be directly converted to the corresponding acyloins according to the following reaction mechanisms:

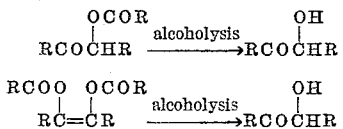

wherein the R radicals are as previously defined. Furthermore, the acyloin esters, enediol diesters, and acyloins can be easily reduced to the corresponding polyfluorocarbyl-1,2-glycols according to the following mechanisms:

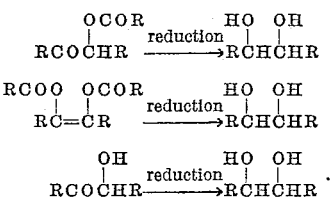

wherein the R radicals are as previously defined. In addition, the polyfluoroacyloins can be directly oxidized to the corresponding polyfluorosubstituted 1,2-diketones according to the following reaction mechanism:

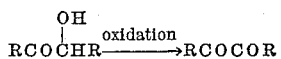

wherein the R radicals are as previously defined. The polyfluorosubstituted 1,2-diketones can also be prepared directly by pyrolysis of the polyfluorosubstituted enediol diesters:

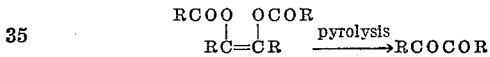

where the R's are as before.

The ready and direct conversion of the polyfluoroacyloin esters and polyfluoroenediol diesters (formed from the polyfluoroacyl halides and nickel carbonyl under the extremely specific reaction conditions just defined) to acyloins and 1,2-diketones has fundamental technical significance, in that previous attempts to prepare polyfluorosubstituted acyloins and 1,2-diketones have failed. Thus, Haszeldine, Nature 168, 1028 (1951), and McBee et al., J. Am. Chem. Soc. 75, 4091 (1953), show that the reaction of sodium on ethyl trifluoroacetate forms trifluoroacetoacetic ester and trifluoroethanol, and not the expected acyloin, $CF_3CHOHCOCF_3$, or 1,2-diketone, $CF_3COCOCF_3$. From these teachings, ignoring the possible significance of the different properties and frequent instability resident in first members of series, one would certainly not except such polyfluorinated acyloins or 1,2-diketones to be formed at all or, if formable, to be formed under such extremely easy conditions.

The following examples, in which the parts given are by weight unless otherwise indicated, are submitted to illustrate further the present invention but in no way to limit it.

*Example I*

A mixture of 75 parts of 5H-octafluorovaleryl chloride, 51 parts of nickel carbonyl, and 30 parts of benzonitrile was stirred at room temperature for 72 hours under anhydrous conditions. Unreacted nickel carbonyl and by-product nickel chloride were removed by filtration, and distillation of the filtrate afforded 15 parts (23% of theory) of the polyfluorinated enediol diester 1H,10H-hexadecafluoro-5-decene-5,6-diol di(5H - octafluorovalerate) as a clear, colorless liquid boiling at 167° C. under a pressure corresponding to 20 mm. of mercury.

*Analysis.*—Calcd. for $C_{20}H_4F_{32}O_4$: C, 26.2%; H, 0.4%;

F, 66.4%; M.W., 920. Found: C, 25.7%; H, 0.6%; F, 66.2%; M.W., 900, 940.

The nuclear magnetic resonance spectrum of the enediol diester exhibited five peaks in the $CF_2$ region: a doublet and four singlets in the ratio 4:4:4:2:2. This is the expected spectrum for the 1,10-dihydroperfluoro-5-decene-5,6-diol di-5-hydroperfluorooctavalerate. The infrared spectrum showed carbonyl absorption at 5.50 microns.

*Example II*

A mixture of 20 parts of benzonitrile, 1,065 parts of 5H-octafluorovaleryl chloride, and 160 parts of nickel carbonyl was stirred at 25° C. for 24 hours under anhydrous conditions. An additional 100 parts of benzonitrile was added, and the stirring was continued at room temperature for an additional two days. At this point, 100 additional parts of nickel carbonyl was added, and stirring was continued at room temperature for an additional 14 days. Unreacted nickel carbonyl and by-product nickel chloride were then removed by filtration. Upon distillation of the filtrate there was obtained 25 parts (5% conversion) of the polyfluoroacyloin ester 1H,6H,10H-hexadecafluoro-5-oxo-6-decyl 5H-octafluorovalerate as a clear, colorless liquid boiling at 117° C. under a pressure corresponding to 3–4 mm. of mercury.

*Analysis.*—Calcd. for $C_{15}H_4O_3F_{24}$: C, 26.2%; H, 0.6%; F, 66.4%. Found: C, 27.4%; H, 1.2%; F, 64.6%.

The nuclear magnetic resonance spectrum showed the expected fluorine peaks in the $CF_2$ region for the trihydrohexadecafluorooxodecyl hydrooctafluorovalerate. Continued distillation of the filtrate afforded 181 parts (19.6% of theory) of the enediol diester 1H,10H-hexadecafluoro-5-decene-5,6-diol di(5H-octafluorovalerate) of Example I as a clear, colorless liquid boiling at 124–129° C. under a pressure corresponding to 3–4 mm. of mercury; $n_D^{25}$, 1.3255.

*Example III*

A mixture of 115 parts of perfluorobutyryl chloride, 41 parts of nickel carbonyl, and 300 parts of benzonitrile was stirred for 72 hours at 25° C. under anhydrous conditions. The reaction mixture was filtered, and the filtrate was distilled. There was thus obtained six parts (6% of theory) of the polyfluorinated acyloin ester 5H-tetradecafluoro-4-oxo-5-octyl perfluorobutyrate as a clear, colorless liquid boiling at 64° C. under a pressure corresponding to 18 mm. of mercury.

*Analysis.*—Calcd. for $C_{12}F_{21}O_3H$: C, 24.3%; H, 0.2%; F, 67.3%. Found: C, 24.6%; H, 0.2%; F, 67.5%.

The nuclear magnetic resonance spectrum showed peaks corresponding to two different types of perfluoropropyl groups in a ratio of 2:1. Proton nuclear magnetic resonance analysis showed a single saturated proton. On continued distillation there was also obtained five parts (5.1% of theory) of the enediol diester perfluoro-4-octene-4,5-diol di(perfluorobutyrate), i.e., 4,5-perfluoro-4-octenylene bis(perfluorobutyrate), as a clear, colorless liquid boiling at 89° C. under a pressure corresponding to 18 mm. of mercury.

*Analysis.*—Calcd. for $C_{16}F_{28}O_4$: C, 24.4%; F, 67.5%. Found: C, 24.9%; F, 66.5%.

Infrared absorption spectrum showed carbonyl absorption at 5.50 microns. The nuclear magnetic resonance spectrum exhibited peaks representing two different types of $C_3F_7$ groups of equal intensity.

*Example IV*

A mixture of 400 parts of benzonitrile, 160 parts of nickel carbonyl, and 1,055 parts of perfluorobutyryl chloride was stirred under anhydrous conditions at room temperature for 72 hours. An additional 100 parts of nickel carbonyl was then added, and the mixture was stirred for an additional 48 hours under the same conditions. Another 100-part portion of nickel carbonyl was then added, and stirring was continued under the same conditions for seven more days. The reaction mixture was then filtered to remove unreacted nickel carbonyl and by-product nickel chloride. Upon distillation of the resultant filtrate, there was obtained 455 parts (51% conversion) of the enediol diester perfluoro-4-octene-4,5-diol di(perfluorobutyrate) as a clear, colorless liquid boiling at 89° C. under a pressure corresponding to 18 mm. of mercury, which was identical with the second product of Example III.

*Example V*

A mixture of 100 parts of perfluoroglutaryl chloride, 62 parts of nickel carbonyl, and 20 parts of benzonitrile was allowed to stand with stirring at room temperature under anhydrous conditions for three days. During the course of the reaction carbon monoxide was slowly evolved, and a precipitate of nickel chloride was formed. The reaction mixture was filtered, and the nickel chloride precipitate was washed with diethyl ether. The ether washings were added to the filtrate. Distillation of the combined liquid afforded 75 parts (75% of theory) of recovered perfluoroglutaroyl chloride and four parts of the enediol diester dodecafluoro-5,6-dihydroxy-trans-5-decene-1,10-dioic acid dilactone, i.e., dodecafluoro-4H-[trans-Δ$^{2,2'}$-bi-2H-pyran]-6,6'(5H,5'H)dione, as a clear, colorless liquid boiling at 93–110° C. under a pressure corresponding to 90 mm. of mercury. The product crystallized from benzene and was sublimed to afford plates of the purified dilactone as plates melting at 88–90° C.

*Analysis.*—Calcd. for $C_{10}F_{12}O_4$: C, 29.1%; F, 55.3%. Found: C, 29.4%; F, 55.6%.

*Example VI*

A mixture of 73 parts of methanol and 600 parts of the enediol diester perfluoro-4-octene-4,5-diol di(perfluorobutyrate)—see Examples III and IV—was stirred at 25° C. As solution took place an exothermic reaction occurred which heated the reaction mixture to reflux temperature. Upon distillation of the reaction product, there was obtained 270 parts of a mixture of methanol and methyl perfluorobutyrate boiling at less than 70° C. under a pressure corresponding to 90 mm. of mercury and 272 parts (90% of theory) of the polyfluoroacyloin 5H-tetradecafluoro-5-hydroxy-4-octanone as a clear, colorless liquid boiling at 70–72° C. under a pressure corresponding to 90 mm. of mercury; $n_D^{25}$, 1.4940. Infrared analysis showed carbonyl absorption at 5.67 microns and hydroxyl absorption at 2.80 microns.

*Analysis.*—Calcd. for $C_8F_{14}H_2O_2$: F, 67.2%. Found: F, 66.8%.

*Example VII*

A mixture of 15 parts of methanol and 91 parts of the enediol diester 1H,10H-hexadecafluoro-5-decene-5,6-diol di(5H-perfluorovalerate)—see Example I—was stirred at room temperature for 15 minutes. Distillation of the resultant mixture afforded methyl 5H-perfluorovalerate and 45.5 parts (100% of theory) of the polyfluoroacyloin 1H,6H,10H-hexadecafluoro-6-hydroxy-5-decanone as a clear, colorless liquid boiling at 74–76° C. under a pressure corresponding to 50 mm. of mercury. Infrared analysis showed carbonyl and hydroxyl absorption.

*Analysis.*—Calcd. for $C_{10}H_4F_{16}O_2$: C, 26.1%; H, 0.9%; F, 66.1%. Found: C, 26.4%; H, 1.0%; F, 66.0%.

*Example VIII*

A mixture of 232 parts of perfluorobutyryl chloride, 264 parts of 5H-octafluorovaleroyl chloride, 100 parts of nickel carbonyl, and 100 parts of benzonitrile was stirred at room temperature for 72 hours under anhydrous conditions. An additional 70 parts of nickel carbonyl was then added, and stirring was continued for an additional week. The reaction mixture was filtered, and the filter cake was washed with diethyl ether. The ether wash was concentrated, and the ether concentrate and filtrate were combined and distilled. The liquid product, boiling at 93° C. under a pressure corresponding to 24 mm. of mercury, was stirred with excess methanol for 15 minutes. Upon distillation of the resultant reaction mixture there was obtained the polyfluoroacyloins: (a) 5H-tetradecafluoro-5-hydroxy-4-octanone—see Example VI—boiling at 70–72° C. under a pressure corresponding to 90 mm. of mercury; (b) 1H,6H,10H-hexadecafluoro - 6 - hydroxy-5-decanone—see Example VII—boiling at 74–76° C. under a pressure corresponding to 50 mm. of mercury; and (c) 50 parts of a mixture of 1H,5H-pentadecafluoro-5-hydroxy-4-nonanone and 4H,9H-pentadecafluoro-4-hydroxy-5-nonanone as a clear, colorless liquid boiling at 87° C. under a pressure corresponding to 40 mm. of mercury. Infrared analysis showed carbonyl absorption and hydroxyl absorption. It was not possible to separate the isomers of fraction (c) by distillation.

*Analysis.*—Calcd. for $C_9H_3F_{15}O_2$: C, 25.2%; H, 0.8%; F, 66.6%. Found: C, 25.7%; H, 1.0%; F, 66.1%.

Example IX

A cylindrical glass reactor fabricated from a commercially available high silica glass sold under the trade name "Vycor," approximately 16 diameters long, was packed with tubular sections of the same type of glass approximately one third the reactor diameter in both width and length. The reactor, attached to solid carbon dioxide/acetone, and liquid nitrogen-cooled traps connected in series, was heated to 600° C. The entire reaction system was then pumped down to a pressure corresponding to about 5 mm. of mercury and 7.5 parts of the enediol perfluoro-4-octene-4,5-diol diperfluorobutyrate—see Example III—was dropped into the heated reaction zone over a period of five minutes. The resultant pyrolysis product (collected in both traps) was combined and distilled from phosphorus pentoxide through a spinning band column of the type described in U.S. Patent 2,712,520. There was thus obtained a total of 0.9 part of products boiling at 92–95° C. Nuclear magnetic resonance spectra and gas chromatographic analyses indicated that the fraction, 0.45 part, boiling at 95° C. at atmospheric pressure was 90–95% pure perfluoro-4,5-octanedione, with the major impurity being the shorter chain monoketone perfluoro-4-heptanone. Infrared analysis showed strong carbonyl absorption at 5.65 microns. Approximately one third of the 95% pure product was further purified by gas chromatography for elemental analysis.

*Analysis.*—Calcd. for $C_8F_{14}O_2$: F, 67.5%. Found: F, 67.4%.

The perfluoro-4,5-octanedione was further characterized by conversion to 2,3-bis(perfluoropropyl)quinoxaline. Thus, 0.25 part of o-phenylenediamine was added to 0.88 part of the above perfluoro-4,5-octanedione. A vigorous reaction ensued. The resultant liquid product was heated with 5.4 parts of acetic anhydride for one hour, 7.9 parts of ethanol was then added, and the resultant mixture was heated at steam bath temperature for 15 minutes. Approximately 20 parts of water was then added, and the lower layer of the resultant mixture was collected and distilled. There was thus obtained 2,3-bis(perfluoropropyl)quinoxaline as a clear, colorless liquid boiling at 75° C. under a pressure corresponding to 3 mm. of mercury; $n_D^{25}$, 1.4195. The nuclear magnetic resonance spectrum showed a $C_3F_7$— grouping and aromatic hydrogen. The ultraviolet spectrum showed absorption at 3200 and 2425A.

*Analysis.*—Calcd. for $C_{14}H_4F_{14}N_2$: F, 57.0%. Found: F, 57.1%.

Example X

A still pot was charged with 100 parts of the acyloin 5H - tetradecafluoro-5-hydroxy-4-octanone—see Example VI—210 parts of acetic acid, and 66 parts of bismuth triacetate. The pot was connected to a spinning band distillation column of the type described in U.S. Patent 2,712,520, and distillation was begun. About 60 parts of product boiling in the range 90–115° C. at atmospheric pressure was collected. Upon redistillation there was obtained 30 parts of a yellow liquid boiling at 96° C. at atmospheric pressure which, by gas chromatography, was shown to be an azeotrope of acetic acid and perfluoro-4,5-octanedione—see Example IX. The pure perfluoro-4,5-octanedione was recovered from the azeotrope by shaking with water and distilling the resultant perfluoro-4,5-octanedione hydrate from phosphorus pentoxide.

Continued distillation of the original distillation residue afforded 20 parts of a mixture of acetic acid and 3H-tridecafluoro-4,5-octanedione as a yellow liquid boiling at 108–110° C. at atmospheric pressure. Gas chromatography afforded the pure 3H-tridecafluoro-4,5-octanedione as indicated by nuclear magnetic resonance analysis.

The identity of the 3H-tridecafluoro-4,5-octanedione was further established by conversion to 2-perfluoropropyl-3-(1H-hexafluoropropyl)quinoxaline. Thus, three parts of the above 3H-tridecafluoro-4,5-octanedione was added to 0.9 part of o-phenylenediamine. The reaction mixture was gently heated over an open flame, and water was then added. The resultant crystalline solid was isolated and sublimed at a pressure corresponding to 100 mm. of mercury to obtain the pure 2-perfluoropropyl-3-(1H-hexafluoropropyl)quinoxaline as plates melting at 42–43° C.

*Analysis.*—Calcd. for $C_{14}H_5N_2F_{13}$: C, 37.5%; H, 1.1%; F, 55.1%. Found: C, 37.8%; H, 1.5%; F, 55.0%.

Example XI

A mixture of 14 parts of the acyloin 1H,6H,10H-hexadecafluoro - 6 - hydroxy-5-decanone—see Example VIII—8 parts of bismuth triacetate, and 52.5 parts of acetic acid was heated to 110° C. and allowed to cool. Upon distillation of the reaction mixture there was thus obtained 1.9 parts of an 80%/20% mixture of 1H,10H-hexadecafluoro-5,6-decanedione and 1H,4H,10H-pentadecafluoro-5,6-decanedione as a clear, colorless liquid boiling at 56–65° C. under a pressure corresponding to 15 mm. of mercury. Continued distillation afforded 3.6 parts of substantially pure 1H,4H,10H-pentadecafluoro-5,6-decanedione as a clear, colorless liquid boiling at 76° C. under a pressure corresponding to 15 mm. of mercury. The 80/20 mixture of the two decanediones and the substantially pure 1H,4H,10H-pentadecafluoro-5,6-decanedione were characterized by fluorine nuclear magnetic resonance analysis.

Example XII

A mixture of 11.2 parts of the enediol diester tetradecafluoro - 4 - octene-4,5-diol di(perfluorobutyrate)—see Example III—105 parts of acetic acid, and 0.2 part of 10% palladium-on-carbon catalyst was shaken in a conventional glass hydrogenation apparatus under 40 lb./sq. in. hydrogen pressure at room temperature for 18 hours. The resulting reaction mixture was vented to the atmosphere, removed from the reactor, filtered, and the filtrate was diluted with 200 parts of water saturated with sodium chloride. The resultant mixture was extracted with about 70 parts of diethyl ether. After removal of the diethyl ether from the ether extract and subsequent purification by distillation, there was obtained 4H,5H-tetradecafluoro-4,5-octanediol as a clear, colorless liquid boiling at 80° C. under a pressure corresponding to 25 mm. of mercury. On standing, the dihydrotetradecafluorooctanediol solidified. Recrystallization from chloroform afforded pure 4H,5H-tetradecafluoro-4,5-octanediol in 50% yield as a white crystalline solid melting at 71–73° C. Fluorine and proton nuclear magnetic resonance were consistent with the dihydrotetradecafluorooctanediol structure.

*Analysis.*—Calcd. for $C_8H_4F_{14}O_2$: F, 66.8%. Found: F, 66.4%.

As is apparent from the foregoing, the present invention is generic to a process for the preparation of perfluoro-, ω-hydroperfluoro-, and ω-chloroperfluorohydrocarbyl acyloin esters and enediol diesters of the structures:

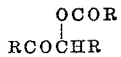

and

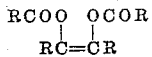

wherein the R radicals, which can be alike or different, are perfluoro-, ω-hydroperfluoro-, and ω-chloroperfluorocarbyl radicals of from three through fourteen carbons, inclusive, from the corresponding perfluoro-, ω-hydroperfluoro-, and ω-chloroperfluorocarbacyl halides, wherein the halogen is of atomic number from 17–35, inclusive, and nickel carbonyl in the presence of benzonitrile at temperatures no greater than 40° C. The present invention is also generic to these new perfluoro-, ω-hydroperfluoro-, and ω-chloroperfluorocarbyl acyloin esters and enediol diestters wherein each perfluoro-, ω-hydroperfluoro-, and ω-chloroperfluorocarbyl radical is from three through fourteen carbons, inclusive. The invention is also generic to the perfluoro-, ω-hydroperfluoro-, and ω-chloroperfluorocarbyl acyloins of the structure:

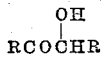

α-diketones of the structure:

RCOCOR and fluorinated α-glycols of the structure:

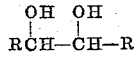

obtainable variously from the acyloin esters and enediol diesters, all as described in further detail in the foregoing.

As discussed above, the operating conditions for the reaction between the nickel carbonyl and the perfluoro-, ω-hydroperfluoro-, and ω-chloroperfluorocarbyl acyl halides are extremely specific. Thus, the reaction can only be effected at temperatures below 40° C. Only nickel carbonyl and no other metal carbonyl can be used. The reaction must be effected in the presence of benzonitrile. Although inert reaction diluents, such as the cyclic and acyclic perfluoro ethers and the like, can be present, the reaction is most simply effected when only the three necessary ingredients, viz., nickel carbonyl, benzonitrile, and the polyfluorocarbacyl halide, are present. The relative proportions of these three necessary ingredients can vary widely. Thus, excesses of either the polyfluorocarbacyl halide or the nickel carbonyl over the amounts called for by the stoichiometry can be used. In the sense of driving the reaction farthest to the desired polyfluorinated acyloin esters and polyfluorinated enediol diesters, it will generally be preferable to use an excess of the nickel carbonyl. While the relative amounts of these two reactants are substantially not significant to the ultimate course of the reaction since any unreacted quantities of either can be recovered and the reaction rerun, the same is not true of the benzonitrile. Excess quantities of benzonitrile based on the nickel carbonyl can be used, for instance, up to 750% by weight, as per Example III. However, under such conditions the conversion to the desired polyfluorinated acyloin esters and polyfluorinated enediol diesters is markedly reduced. Accordingly, for best operating efficiency, the benzonitrile will be present in amounts ranging from about 25 to about 100% by weight based on the nickel carbonyl.

Any perfluoro-, ω-hydroperfluoro-, or ω-chloroperfluorocarbacyl halide wherein the radicals pendent on the carbonyl carbon contain from three through fourteen carbons, inclusive, can be used, including those instances where these polyfluorinated radicals are cyclic, straight, or branched chain radicals. The halides of the carbacyl halide function can be halogen of atomic number from 17–35, i.e., the polyfluorinated carbacyl chlorides, and carbacyl bromides can be used. Because of their present preferred commercial position as to availability and cost, the preferred polyfluorinated carbacyl halides will be the carbacyl chlorides. Also because of their current readier availability, the most preferred perfluoro-, ω-hydroperfluoro-, and ω-chloroperfluorocarbacyl halides will be those which are straight chain in nature. As specifically illustrated in detail in the foregoing examples, mixtures of the polyfluorocarbacyl halides can be used, in which case mixtures of products will be obtained, i.e., the polyfluorinated acyloin esters and polyfluorinated enediol diesters in which the various polyfluorocarbyl radicals from the polyfluorocarbacyl halides will appear variously in the same or different molecule. While these mixtures can in general, at least in part, be separated, some of the isomeric structures arising cannot be separated by conventional techniques, e.g., distillation, and, accordingly, normally it will not be preferred to use mixtures of the carbacyl halides.

More specifically, in place of the polyfluorocarbacyl halides used in the foregoing detailed examples, there can also be used in the process of this invention to prepare additional further examples of the products of this invention the following polyfluorocarbacyl halides: perfluorocaproyl chloride, perfluoropelargonyl bromide, ω-hydroperfluorooenanthyl chloride, ω-hydroperfluoropelargonyl bromide, ω-hydroperfluorobutyryl bromide, ω-chloroperfluorobutyryl chloride, ω-chloroperfluorooenanthyl bromide, ω-chloropelargonyl bromide, ω-chloroperfluorohendecanoyl bromide, ω-chloroperfluoropentadecanoyl bromide, and ω-hydroperfluoropentadecanoyl chloride.

Using these and other like polyfluoroacyl halides, there can be mentioned as illustrative of the polyfluoroenediol diesters of the present invention the following compounds made by reaction of the respective polyfluorocarbacyl halides with nickel carbonyl in the presence of benzonitrile under the conditions previously described: 1,8-dichlorododecafluoro - 4 - octene - 4,5-diol di(3-chlorohexafluorobutyrate), perfluoro-9-octadecene-9,10-diol di(perfluorononanoate), 1H,14H-tetracosafluoro-7-tetradecene-7,8-diol di(7H-dodecafluoroheptanoate), 1,10-dichlorohexadecafluoro-5-decene-5,6-diol di(5 - chlorooctafluorovalerate), 1,30-dichlorohexapentacontafluoro-15-triacontene-15,16-diol di(15 - chlorooctacosafluoropentadecanoate).

In a similar fashion, the polyfluorinated acyloin esters of this invention can be prepared in the same fashion by reaction of the requisite polyfluorocarbacyl halide with nickel carbonyl in the presence of benzonitrile: 7H-docosafluoro-6-oxo-7-dodecyl perfluorohexanoate, 1H, 10H,18H-dotriacontafluoro-9-oxo-10-octadecyl 9H-hexadecafluorononanoate, 8H,1,14-dichlorotetracosafluoro-7-oxo-8-tetradecyl 7 - chlorododecafluoroheptanoate, 1H, 16H,30H-hexapentacontafluoro-15-oxo-16-triacontyl 15H-octacosafluoropentadecanoate, 1H,5H,8H-dodecafluoro-4-oxo-5-octyl 4H-hexafluorobutyrate.

As pointed out previously, these new polyfluorinated acyloin esters and polyfluorinated enediol diesters are quite versatile chemical intermediates. They can be readily converted to the related polyfluorinated acyloins, polyfluorinated diketones, and polyfluorinated α-glycols. More specifically, the polyfluorinated acyloin esters and polyfluorinated enediol diesters can be converted to the polyfluorinated acyloins by simple and direct alcoholysis, which removes, respectively, the polyfluorocarbyl ester group of the acyloin esters and both of the polyfluorocarbyl ester groups of the enediol diesters. The reaction is straightforward and simple. The polyfluorinated acyloin or polyfluorinated enediol diester is simply brought in contact with an alcohol, e.g., methanol, although higher chain alcohols such as ethanol, butyl alcohol, and the like can be used. The reaction mixture is stirred, and generally after a short induction period, an exothermic reaction occurs. Reaction times can vary from as short as fifteen minutes to several hours. The reaction need not be, but can be if desired, externally heated to accomplish the alcoholysis even faster. Examples of the new polyfluorinated acyloins of the present invention, in addition to those already illustrated in detail, include the following obtainable from the previously illustrated polyfluorinated acyloin esters and polyfluorinated enediol diesters: 7H-docosafluoro - 7 - hydroxy-6-dodecanone, 1H, 12H,22H - tetracontafluoro - 12 - hydroxy-11-docosanone, 1,10-dichlorohexadecafluoro-6-hydroxy-5-decanone, 16H-hexapentacontafluoro-16-hydroxy-15-triacontanone.

These polyfluorinated acyloins can be oxidized directly to the polyfluorosubstituted 1,2-diketones. Suitable oxidation techniques involve bismuth triacetate, for example, at temperatures from 50–150° C. or higher. Other conventional organic oxidizing agents, or, for that matter, oxygen itself either alone or in the presence of oxidation catalysts, at ambient or elevated temperatures can serve to effect the oxidation. These same polyfluorinated 1,2-diketones can also be prepared directly from the previously illustrated perfluorosubstituted enediol diesters by simple pyrolysis. Generally the pyrolysis will be carried out at temperatures in the range 400–700° C. or thereabouts, using conventional pyrolysis equipment, preferably with the normal type packings in the pyrolysis tube. Suitable specific examples of these new polyfluorinated 1,2-diketones include: perfluoro-6,7-dodecanedione, 1H,22H-tetracontafluoro-11,12-docosanedione, 1,10-dichlorohexadecafluoro-5,6-decanedione, 1H,30H - hexapentacontafluoro-15,16-triacontanedione, 5H - heneicosafluoro-6,7-dodecanedione, 1H,10H,22H - nonatriacontafluoro-1,11,12-docosanedione, 4H,1,10-dichloropentadecafluoro-5,6-decanedione, and 1H,14H,30H - pentapentacontafluoro-15,16-triacontadione.

Finally, the polyfluorinated acyloin esters, the polyfluorinated enediol diesters, or the derived polyfluorinated acyloins can be reduced to the polyfluorinated 1,2-diglycols, i.e., the α-glycols. Reduction can be carried out by any conventional chemical means and is most simply effected by hydrogen itself. Reaction conditions can vary as known to those skilled in the hydrogenation art. With these polyfluorinated acyloin esters, enediol diesters, and acyloins, reduction to the polyfluorinated α-glycols can be effected under the mildest of conditions, e.g., room temperature at 40 lb. hydrogen pressure or thereabouts. Generally some kind of inert reaction medium will be used, such as acetic acid. Catalysts may be used to effect the reaction faster under even milder techniques. With some of the longer chain polyfluorinated acyloin esters, polyfluorinated enediol diesters, and polyfluorinated acyloins, higher temperatures and higher hydrogen pressures will be required, but normally the reduction to the polyfluorinated α-glycols will not require conditions appreciably more stringent than 100° C. at 1000 lb. hydrogen pressure. Suitable additional examples of these new polyfluorinated α-glycols include: 6H,7H,-docosafluoro-6,7 - dodecanediol, 1H,7H,8H,14H-tetracosafluoro-7,8-tetradecanediol, 1H,11H,12H,22H-tetracontafluoro-11,12-docosanediol, 5H,6H,1,10-dichlorohexadecafluoro - 5,6 - decanediol, 15H,16H-hexapentacontafluoro - 15,16 - triacontanediol.

These various polyfluorosubstituted acyloin esters, enediol diesters, 1,2-diketones, and α-glycols have many varied uses. For instance, the polyfluorosubstituted 1,2-diketones are useful as polymerization photoinitiators, i.e., as materials which, when combined with an addition polymerizable, ethylenically unsaturated monomer, will activate the mixture so that, when the mixture is exposed to light, generally of 1800 to 7000 A., the polyfluorinated 1,2-diketones decompose under the influence of said light to form active free-radicals which initiate the polymerization of the ethylenically unsaturated monomer—see, for instance, U.S. 2,367,660, where a similar polymerization initiation action is described for the corresponding hydrocarbon compound. By virtue of the high content of fluorine-to-carbon links, these polyfluorosubstituted 1,2-diketones are stabler than their corresponding hydrocarbon compounds and also have greater affinity for, and accordingly a higher utility in, the polymerization under light-induced conditions of the polyfluoro-substituted ethylenically unsaturated monomers. In like manner, the polyfluorosubstituted acyloins serve similarly as photoinitiators for ethylenically unsaturated monomers, again particularly for the polyfluorosubstituted ethylenic monomers—see, for instance, U.S. 2,367,661, where a similar initiating activity is described for the corresponding hydrocarbyl acyloins.

The polyfluorosubstituted 1,2-diketones are also useful in an entirely different sense in the polymerization field in that they are polymerizable comonomers for the ethylenically saturated oxo- or thiocarbonyl-containing addition polymerizable monomers. More specifically, the perfluoro-4,5-octanedione of Example IX can be copolymerized with thiocarbonyl difluoride to form an elastomeric copolymer containing two combined mole percent of the perfluoro-4,5-octanedione and 98 combined mole percent of the fluorothiocarbonyl difluoride. The copolymer is somewhat nervier than the thiocarbonyl difluoride homopolymer.

The polyfluorinated 1,2- or α-glycols have obvious utility as intermediates in the formation of polyfluorosubstituted condensation polyesters.

The enediol diesters by virtue of their diester functionality can, like the α-glycols, serve as intermediates in the formation of polyfluorosubstituted condensation polyesters by the well-known technique of ester interchange. Thus, the polyfluorosubstituted enediol diester is mixed with a dibasic acid which is higher boiling than the polyfluorosubstituted carbacyl acid corresponding to the polyfluorosubstituted carbacyl ester group in the enediol diester structure, and on heating, preferably in the presence of an ester interchange catalyst, the polyfluorosubstituted carbacyl acid moiety of the enediol diester is distilled off and there remains a condensation polyester of the higher boiling dibasic acid and the enediol.

The longer chain acyloins, 1,2-diketones, and α-glycols, and to a lesser extent the acyloins and enediol diesters, are also useful as surfactants, i.e., dispersing agents, particularly for waxes, oils, and greases, and especially for the polyfluorinated low molecular weight polymers.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process which comprises reacting, in the presence of liquid benzonitrile and at a temperature below 40° C., nickel carbonyl and at least one polyfluoroacyl halide of the formula RCOX wherein R is selected from the group consisting of perfluoro-, ω-hydroperfluoro-, and ω-chloroperfluorocarbyl radicals of 3–14 carbons free of aliphatic unsaturation and X is halogen of atomic number 17–35.

2. The process of claim 1 employing a fluorinated valeryl halide.

3. The process of claim 2 employing 5H-octafluorovaleryl chloride.

4. The process of claim 1 employing a fluorinated butyryl halide.

5. The process of claim 4 employing perfluorobutyryl chloride.

6. The process of claim 1 employing a fluorinated glutaryl halide.

7. The process of claim 6 employing perfluoroglutaryl chloride.

8. A compound of the formula

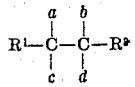

wherein $R^1$ and $R^2$ are selected from the group consisting of perfluoro-, ω-hydroperfluoro-, and ω-chloroperfluorocarbyl radicals of 3–14 carbons free of aliphatic unsaturation, and valence $a$ is satisfied by a member of the group consisting of (A) one half of a carbon-to-carbon double bond shared with valence $b$, an ethylenic linkage between the depicted carbons being formed thereby, in which case valences $c$ and $d$ are satisfied by

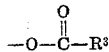

and

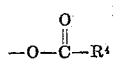

respectively, $R^3$ and $R^4$ being chosen from the group consisting of monovalent perfluoro-, ω-hydroperfluoro-, and ω-chloroperfluorocarbyl radicals and divalent perfluorocarbyl radicals joined respectively to $R^1$ and $R^2$, $R^3$ and $R^4$ being of 3–14 carbons free of aliphatic unsaturation and (B) one half of a carbon-to-oxygen double bond, the other half of said bond being supplied by valence $c$, in which case valence $b$ is hydrogen, valence $d$ being satisfied by

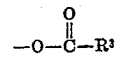

$R^3$ being as defined above.

9. A compound of the formula

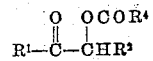

wherein $R^1$, $R^2$ and $R^4$ are as defined in claim 8.

10. A compound of the formula

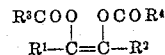

wherein $R^1$, $R^2$, $R^3$ and $R^4$ are as defined in claim 8.

11. 1H,10H - hexadecafluoro-5-decene-5,6-diol di(5H-octafluorovalerate).

12. 5H-tetradecafluoro-4-oxo-5-octyl perfluorobutyrate.

13. Perfluoro-4-octene-4,5-diol di(perfluorobutyrate).

References Cited in the file of this patent

UNITED STATES PATENTS

| | | |
|---|---|---|
| 2,559,628 | Joyce | July 10, 1951 |
| 2,802,862 | Senkbeil | Aug. 13, 1957 |
| 2,879,298 | Seligman | Mar. 24, 1959 |
| 2,915,531 | Wolf et al. | Dec. 1, 1959 |